United States Patent
Clark et al.

(10) Patent No.: US 12,331,850 B2
(45) Date of Patent: Jun. 17, 2025

(54) LOW PERMEATION TYPE C AIR CONDITIONING HOSE

(71) Applicant: Danfoss Power Solutions II Technology A/S, Nordborg (DK)

(72) Inventors: Aaron David Clark, Lambertville, MI (US); Gina Clark, Lambertville, MI (US); Colleen Marie Hathaway, Dundee, MI (US)

(73) Assignee: DANFOSS POWER SOLUTIONS II TECHNOLOGY A/S, Nordborg (DK)

( * ) Notice: Subject to any disclaimer, the term of this patent is extended or adjusted under 35 U.S.C. 154(b) by 478 days.

(21) Appl. No.: 17/631,009

(22) PCT Filed: Jul. 24, 2020

(86) PCT No.: PCT/EP2020/025345
§ 371 (c)(1),
(2) Date: Jan. 28, 2022

(87) PCT Pub. No.: WO2021/018413
PCT Pub. Date: Feb. 4, 2021

(65) Prior Publication Data
US 2022/0275886 A1   Sep. 1, 2022

Related U.S. Application Data

(60) Provisional application No. 62/880,790, filed on Jul. 31, 2019.

(51) Int. Cl.
*F16L 11/08*  (2006.01)
*B29C 48/00*  (2019.01)
(Continued)

(52) U.S. Cl.
CPC .......... *F16L 11/085* (2013.01); *B29C 48/022* (2019.02); *B29C 48/09* (2019.02);
(Continued)

(58) Field of Classification Search
CPC ................... C08L 23/16; C08L 11/00
(Continued)

(56) References Cited

U.S. PATENT DOCUMENTS 3,891,725  A  *  6/1975  Klever .................... C08L 11/00
                                                       524/472
4,100,123  A  *  7/1978  Westermann ........... C08L 11/00
                                                       525/213
(Continued)

FOREIGN PATENT DOCUMENTS

EP          270280  A  *  6/1988  ............... C08K 3/04
EP       1393889  A1      3/2004
(Continued)

OTHER PUBLICATIONS

International Search Report for PCT/EP2020/025345 Dated Sep. 30, 2020.

*Primary Examiner* — Michael C Romanowski
(74) *Attorney, Agent, or Firm* — McCormick, Paulding & Huber PLLC

(57) ABSTRACT

An improved Type C air conditioning hose is provided that meets or exceeds SAE J2064 and J3062 requirements, offers good flexibility and fracture resistance, and exhibits improved permeation ratings for refrigerants including R134a and R1234yf. The multilayer type C barrier air conditioning hose includes an inner elastomeric tube layer capable of direct bonding to plastic without an intervening adhesive. The inner elastomeric layer is prepared from a first elastomeric composition comprising a blend of an ethylene propylene diene terpolymer rubber (EPDM) and a chloroprene rubber (CR), phenylenedimaleimide, and a maleated compound.

28 Claims, 5 Drawing Sheets

(51) Int. Cl.
  *B29C 48/09* (2019.01)
  *B29C 48/21* (2019.01)
  *B29K 23/00* (2006.01)
  *B29K 77/00* (2006.01)
  *B29L 23/00* (2006.01)

(52) U.S. Cl.
  CPC .......... *B29C 48/21* (2019.02); *B29K 2011/00* (2013.01); *B29K 2023/16* (2013.01); *B29K 2077/00* (2013.01); *B29K 2995/0067* (2013.01); *B29K 2995/0069* (2013.01); *B29L 2023/005* (2013.01); *Y10T 428/1393* (2015.01)

(58) Field of Classification Search
  USPC .............................................. 428/34.1–36.92
  See application file for complete search history.

(56) References Cited

U.S. PATENT DOCUMENTS

| | | | | |
|---|---|---|---|---|
| 4,633,912 | A * | 1/1987 | Pilkington | B29D 23/001 156/143 |
| 4,905,735 | A * | 3/1990 | Akiyoshi | F16L 11/08 428/36.1 |
| 4,987,017 | A * | 1/1991 | Sato | F16L 11/12 428/34.7 |
| 5,488,975 | A | 2/1996 | Chiles et al. | |
| 6,294,600 | B1 * | 9/2001 | Takada | C08K 5/3415 524/105 |
| 6,435,217 | B1 * | 8/2002 | Bertero | F16L 11/08 138/137 |
| 9,841,125 | B2 | 12/2017 | Clark et al. | |
| 2002/0189699 | A1 | 12/2002 | Wilson et al. | |
| 2005/0059763 | A1 | 3/2005 | Beck | |
| 2008/0202619 | A1 * | 8/2008 | Hirai | F16L 11/085 138/137 |
| 2012/0145275 | A1 * | 6/2012 | Seebold | B32B 25/042 264/209.6 |
| 2013/0186540 | A1 * | 7/2013 | Bergman | C08K 5/54 152/510 |
| 2013/0236670 | A1 * | 9/2013 | Hamaguchi | C09J 11/06 524/92 |
| 2015/0075666 | A1 * | 3/2015 | Clark | F16L 11/085 138/137 |

FOREIGN PATENT DOCUMENTS

| | | | | |
|---|---|---|---|---|
| EP | 2576203 | A1 | 4/2013 | |
| JP | H0293186 | A | 4/1990 | |
| WO | WO-9502011 | A1 * | 1/1995 | ............. C08L 11/00 |

* cited by examiner

LOW PERMEATION TYPE C AIR CONDITIONING HOSE

CROSS-REFERENCE TO RELATED APPLICATION

This application is a National Stage application of International Patent Application No. PCT/EP2020/025345, filed on Jul. 24, 2020, which claims priority to U.S. Application No. 62/880,790 filed on Jul. 31, 2019, each of which is hereby incorporated by reference in its entirety.

TECHNICAL FIELD

An improved type C air conditioning hose is provided that meets or exceeds SAE J2064 and J3062 requirements, offers good flexibility and fracture resistance, and exhibits very low permeation ratings for a variety of refrigerant gases including RI 34a and RI 234yf. The multi-layer type C barrier air conditioning hose includes a novel blended elastomer layer that directly bonds to the thermoplastic barrier material without adhesive, and has very low extractible content.

BACKGROUND

Existing automotive refrigerant hoses can exhibit undesirable permeation relative to new refrigerants. A hose loses utility if it becomes permeable to outside elements (ingression) or to fluid passing through the hose (effusion). Incorporation of a thermoplastic layer may help decrease permeability.

Type E refrigerant hose employs an inner thermoplastic veneer lining with an elastomeric tube outer layer. Under SAE 3062, a Type E hose is a veneer, textile-reinforced hose design having a suitable thermoplastic veneer lining the inside diameter with an elastomeric tube outer layer. The reinforcement shall be of a textile yarn, cord or fabric adhered to the tube and cover. The cover shall be heat- and ozone-resistant synthetic elastomer. Type E veneer hoses may offer low permeation and operating temperatures, but use of adhesives to bond the thermoplastic layer to the elastomeric layer in hoses can result in spotty adhesion. Type E hoses may exhibit low permeation, but may have limited flexibility and higher cost.

U.S. Pat. No. 9,841,125 B2, Clark et al., disclose a Type E veneer hose comprising an inner veneer having two or more polyamide layers, an elastomeric backing layer directly bonded to the polyamide veneer without an intervening adhesive, a reinforcement layer, and an outer elastomeric cover layer. This type E veneer hose exhibits very low permeation to R134a (1,1,1,2-tetrafluoroethane, CF3CH2F) and R1234yf (2,3,3,3-tetrafluoropropene, CH2=CFCF3).

Another type of refrigerant hose is a Type C refrigerant hose including a thermoplastic barrier between two elastomeric layers. Under SAE 3062, a Type Chose is a barrier, textile reinforced hose having a suitable thermoplastic barrier between elastomeric layers. The reinforcement shall consist of suitable yarn, cord, or fabric adhered to the tube and cover. The outer cover shall be heat- and ozone-resistant synthetic elastomer.

Type C barrier hoses may exhibit better flexibility than Type E veneer hoses due to the inner elastomeric layer and may be lower cost. One problem shared by Type E and Type C hoses is the need to employ adhesive to bond an elastomeric layer to a thermoplastic layer. Although the elastomeric backing layer of Clark et al. supra exhibited strong bonding to the inner polyamide layer without adhesive, use of the same elastomeric formulation in a Type C hose may result in an unacceptable amount of extractible content. Thus, another problem with Type C barrier hoses is the need to minimize extractible content.

An economical flexible Type C refrigerant hose having a thermoplastic barrier between two elastomeric layers, wherein the elastomeric layers are directly bonded to the thermoplastic layer, without an intervening adhesive, and wherein the hose exhibits very low permeation to refrigerants, and very low extractible content, is desirable.

SUMMARY

A novel Type C air conditioning hose is provided that exhibits the lowest refrigerant gas permeation values in the industry using a variety of gases including R1234yf and R134a. A novel blended elastomer layer is employed in the design that directly bonds to the thermoplastic barrier material and has very low extractible content. This elastomer eliminates the need for resins or adhesives that hinder the temperature capability, robustness and extractible allowance (1 kg/m2/yr).

The disclosure provides an Air Conditioning barrier (type C) hose used to convey refrigerant gases including RI 234yf and RI 34a. An exemplary configuration of the barrier Type Chose design is illustrated in FIG. I showing a representative multi-layer hose 100 including an inner elastomeric tube material 102, followed by a thermoplastic barrier layer 104, then an elastomeric backing overlay 106, next a textile reinforcement braid layer 108, followed by a weathering resistant outer cover material 110. The inventive Type C barrier hose incorporates a novel peroxide cured blended elastomer tube and backing material that directly bonds to the polyamide barrier thermoplastic material eliminating the need for adhesive application. The primary responsibility of the polyamide barrier material is to control the gas permeation resistance of the hose.

A refrigerant hose is provided comprising a multiplicity of layers including an innermost elastomeric layer directly bonded to a polyamide (PA) layer, wherein the innermost elastomeric layer is prepared from a first elastomeric composition capable of direct bonding to a thermoplastic layer without an intervening adhesive.

The elastomeric composition may include a blend of an ethylene propylene diene monomer (EPDM) and a chloroprene rubber (CR), a phenylenedimaleimide, and a maleated compound. The blend of EPDM/CR may be in a weight ratio of from 90:10 to 70:30; 85:15 to 75:25, or about 80:20.

The ethylene propylene diene monomer (EPDM) may comprise a low ethylene EPDM having no more than about 60 wt % ethylene compared to the total weight of EPDM. The EPDM may comprise one or more EPDMs, two or more EPDMs, or three or more EPDMs, comprising a combined average ethylene content of no more than about 65 wt % ethylene content, no more than about 62 wt % ethylene content, or no more than about 60 wt % ethylene content. In some embodiments, the EPDM is a combination or two or more EPDMs including a low ethylene EPDM (having no more than 60 wt % ethylene content) and a high ethylene EPDM (having >65 wt % ethylene content), such that the combined average ethylene content of no more than about 65 wt % ethylene content, no more than about 62 wt % ethylene content, or no more than about 60 wt % ethylene content, or from about 55 wt % to about 65 wt %, or about from 58 wt % to about 63 wt % ethylene. In some embodiments, the ratio of low ethylene EPDM to high ethylene EPDM may be from about 1:3 to about 10:1, about 1:2 to about 5:1, or about 1:1 to about 4:1.

An elastomeric composition is provided that is capable of direct bonding to a plastic without use of an adhesive. The plastic may be any suitable plastic. For example, the plastic may be a thermoplastic. The thermoplastic may include a polyamide or a polyvinylidene fluoride (PVDF).

The elastomeric composition may include a plasticizer, for example, wherein the plasticizer is present in the elastomeric composition at from 3 to 7 parts per hundred (pph), 3.5 to 5.5 pph, or about 5 pph relative to 100 pph of the EPDM/CR rubber blend. The plasticizer may be selected from a petroleum extract, heavy paraffinic distillate solvent, a paraffinic process oil, a paraffinic process oil silicon dioxide blend plasticizer, and/or a white mineral oil. The elastomeric composition capable of direct bonding to a thermoplastic may include a phenylenedimaleimide, which may be present in the elastomeric composition at from 1 to 10 pph, 2 to 5 pph, or about 3 pph relative to 100 pph of the EPDM/CR blend.

The elastomeric composition capable of direct bonding to a thermoplastic may include a phenylenedimaleimide that is N, N'-m-phenylenedimaleimide (HVA-2).

The elastomeric composition capable of direct bonding to a thermoplastic may include a maleated compound, that may be present in the elastomeric composition at from 5 to 15 pph, 7 to 12 pph, or about 10 pph relative to 100 pph of the EPDM/CR blend. The maleated compound may be a maleated polybutadiene.

The elastomeric composition capable of direct bonding to a thermoplastic may include one or more fillers. The combined one or more fillers may present at from 40 to 120 pph, 50 to 110 pph, 60 to 100 pph, 70 to 90 pph or about 80 pph relative to 100 pph of the EPDM/CR blend. The one or more fillers may be selected from one or more of the group consisting of carbon black, silica, silicates, talc, aluminum silicate, calcium carbonate, zinc oxide, titanium dioxide, and stearic acid.

The elastomeric composition may include an antioxidant, and an organic peroxide.

The polyamide layer may be prepared from a second composition comprising one or more of polyamide 6,6; polyamide 6; or polyamide 6/12.

The innermost elastomeric layer may be directly bonded to the polyamide layer without adhesive.

In some embodiments, a cured elastomeric composition is provided that is capable of direct bonding to a polyamide without adhesive may exhibit a minimum tensile of 1425 psi; a minimum elongation of 120%; a minimum modulus of 1125 psi; a Shore A hardness of 84 (±5); and/or a specific gravity of 1.25 (±0.3).

An Type C refrigerant hose is provided, which includes in an innermost to outer most direction the inner elastomeric barrier tube, the polyamide layer, an elastomeric backing layer, a reinforcement layer, and an outer elastomeric cover layer.

The elastomeric backing layer may be prepared from the elastomeric composition capable of direct bonding to a polyamide according to the disclosure. The elastomeric backing layer may be directly bonded to the polyamide layer without adhesive.

The reinforcement layer may be a copolyester braid.

The outer cover layer may be prepared from a second elastomeric composition comprising a chlorobutyl rubber.

In some embodiments, a refrigerant hose according to the disclosure may exhibit no more than 1 kg/m2/year, no more than 0.5 kg/m2/yr, or no more than 0.30 kg/m2/year permeation of a refrigerant after 600 hours at 60° C. when subjected to a permeation test in accordance with SAE J2064, wherein the refrigerant is selected from the group consisting of R134a and R1234yf.

In some embodiments, a refrigerant hose according to the disclosure may exhibit no more than 1 kg/m2/year, or no more than 0.6 kg/m2/yr, permeation of a refrigerant after 600 hours at 80° C. when subjected to a permeation test in accordance with SAE J2064, wherein the refrigerant is selected from the group consisting of R134a and R1234yf.

In some embodiments, a refrigerant hose according to the disclosure may exhibit no more than 5 g/m2, no more than 3 g/m2, or no more than 1 g/m2 extractible content when subjected to an extraction test performed according to SAE J3062.

In some embodiments, the inner elastomeric layer may exhibit adhesion to the polyamide layer of greater than 40 lbf, or greater than 45 lbf, when tested in accordance with ASTMD 413-81 or SAE J3062.

A method of making a hose is provided comprising: (i) blending a first composition comprising a blend of an ethylene propylene diene terpolymer rubber (EPDM) and a chloroprene rubber (CR), a maleic anhydride and phenylenedimaleimide and extruding the first composition over a mandrel to form an inner elastomeric layer; (ii) applying a thermoplastic barrier layer composition comprising a polyamide over the inner elastomeric layer; (iii) extruding an elastomeric backing layer over the polyamide layer; (iv) applying a textile reinforcement layer over the rubber backing layer; (v) extruding an elastomeric cover layer over the reinforcement layer to form a green hose; (vi) vulcanizing the green hose to form a cured hose; and (vii) expelling the cured hose from the mandrel. The extrusion may include shearing and heating. The vulcanizing may be performed at a temperature of 280-330° F. (138-166° C.), or 284-320° F. (140-160° C.).

DETAILED DESCRIPTION

Figure 1:
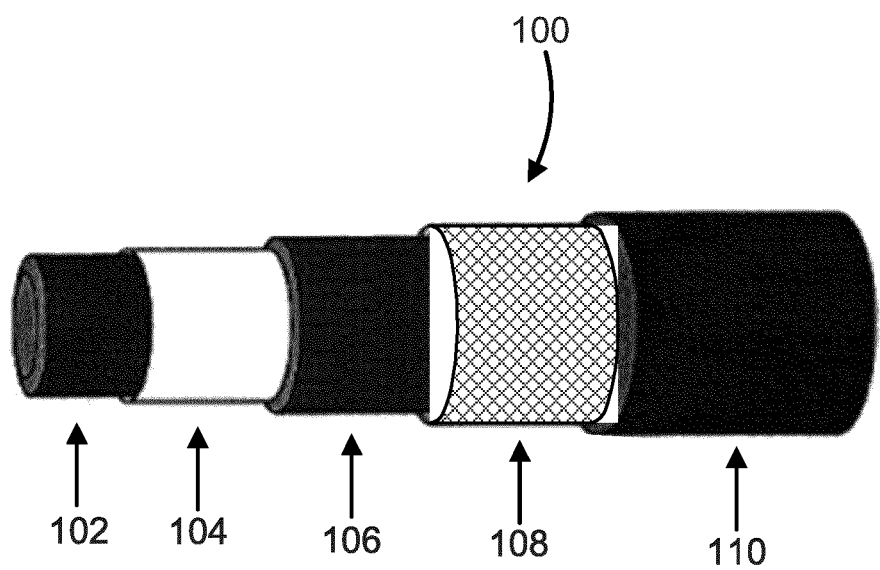
FIG. 1 shows an exemplary type C barrier hose according to the disclosure. The multilayer barrier design hose includes from the inner to outward direction an inner elastomeric tube layer, a plastic barrier layer, an elastomeric backing layer, a textile reinforcement layer, and an outer elastomeric cover layer.

As used herein, the terms "a" or "an" are defined as singular or plural.

As used herein, the term "about" means within ten percent (10%) of the given value, either ten percent more than the given amount or ten percent less than the given amount, or both.

As used herein, the term "composition" refers to one or more of a compound, mixture, blend, alloy, polymer and/or copolymer.

As provide herein, ranges are intended to include, at least, the numbers defining the bounds of the range.

Adhesive used to bond a plastic layer to a rubber layer in standard refrigerant hoses can result in spotty adhesion. In order to solve this problem, methods and compositions have been developed to provide direct bonding of a blended EPDM/chloroprene rubber inner tube layer and backing layer to an intervening thermoplastic layer of a refrigerant hose, without an intervening adhesive layer. In some embodiments, hoses are provided that exhibit increased low and high temperature capabilities and decreased permeation compared to standard refrigerant hoses.

Ethylene-propylene-diene modified rubber (EPDM, EPM) offers excellent ozone, chemical, weather, UV, and aging resistance. EPDM may exhibit poor resistance to petroleum-based fluids.

Chloroprene rubber (CR) offers good weathering resistance, resilience and abrasion strength alone with flame retarding properties and good resistance to refrigerants, steam and CO2, and moderate resistance to petroleum based fuels.

The rubber barrier tube 102 and/or the rubber backing layer 106 may be prepared from a elastomeric composition comprising a blend of ethylene propylene diene terpolymer modified (EPDM) rubber, chloroprene rubber (CR), N,N'-m-phenylenedimaleimide (HVA-2), and a maleated compound. The chloroprene rubber is added to the EPDM rubber to improve oil resistance.

The elastomeric composition allows for direct bonding to polyamide without an intervening adhesive layer upon vulcanization. The rubber barrier tube 102 and/or rubber backing layer 106 may be prepared from a composition comprising EPDM, CR, HVA-2, a maleated compound and one or more each of plasticizers, fillers, vulcanizing agents, peroxides, and/or or antioxidants. The rubber barrier tube 102 and/or the rubber backing layer 106 may be prepared from an elastomeric composition that does not contain polyvinyl butyral (PVB). The rubber barrier tube 102 and/o the rubber backing layer 106 may be prepared from an elastomeric composition that does not contain polypropylene. The rubber barrier tube 102 and/or the rubber backing layer 106 may be prepared from an elastomeric composition that does not contain a polyamide.

EPDM rubbers are produced by polymerization of a mixture of ethylene and propylene and optionally a diene, for example, in the presence of a Ziegler-Natta catalyst, such as, for example, diethylaluminum chloride; or a metallocene catalyst. The diene may be, for example, 2-ethylidene-5-norbornene (ENB) or a dicyclopentadiene (DCPD). For example, the EPDM may be produced using an ENB with a metallocene catalyst (e.g., Dow INSITE™). Any suitable EPDM may be employed, depending on the desired characteristics. For example, compression set (C Set) is one of the primary characteristics of a rubber compound directing low temperature sealing capability. EPDM ethylene content is an important factor influencing this compression effect. As the ethylene content increases, a low-level of crystallinity develops above about 55%-65%. If the ethylene/propylene ratio is about equal and the distribution of both monomers in the polymer chain is random then the EPDM is amorphous. Polymers with ethylene content above 60% tend to show high compression set, while the amorphous (no more than 60% ethylene) materials provide decreased set values at low temperatures.

The rubber barrier layer 102 and/or the rubber backing layer 106 may be prepared from a rubber backing layer composition comprising one or more, two or more, or three or more EPDMs. In some embodiments, the EPDM comprises a low ethylene EPDM having no more than about 60 wt % ethylene content "x". In some embodiments, the EPDM is selected from one or more, two or more, or three of more EPDMs having a combined average ethylene content "x" in a range of from about 45 wt % to about 65 wt % ethylene; about 50 wt % to about 62 wt % ethylene; or about 55 wt % to about 60 wt % ethylene content. The ethylene content in the one or more EPDMs may be determined by ASTM D-3900.

In some embodiments, the EPDM has propylene content "y" in the range of 30-50 wt %, or 35-45 wt %. In some embodiments, the propylene may be determined by may be determined by ASTMD-3900.

In some embodiments, the EPDM has ethylidene norbornene (ENB) content "z" in the range of 1-10 wt %, 2-8 wt %, or 4-6 wt % ENB. The ENB content may be determined by ASTM D-6047.

In some embodiments, the EPDM has a Mooney Viscosity (ML 1+4 at 125° C.) within the range from about 20 MU to about 80 MU. In some embodiments, the EPDM has low Mooney Viscosity within the range from about 20 MU to about 30 MU.

The rubber barrier tube 102 composition and/or rubber backing layer 106 composition may include one or more suitable EPDM materials as defined herein. The EPDM may include one or more commercially available EPDM products, such as, for example Vistalon™ 2504 (an ethylene propylene diene terpolymer rubber having about 57.5 wt % ethylene content by ASTM D3900A, ExxonMobil Chemical); Vistalon™ 3666 (an ethylene propylene diene terpolymer rubber having about 64 wt % ethylene content by ASTM D3900A, ExxonMobil Chemical); Vistalon™ 2502 (an ethylene propylene diene terpolymer rubber having about 57.5 wt % ethylene content by ASTM D3900A, ExxonMobil Chemical); Vistalon™ 5601 (an ethylene propylene diene terpolymer rubber having about 69 wt % ethylene content by ASTM D3900A, ExxonMobil Chemical); Nordel™ IP 3670

(a slightly crystalline, ethylene-propylene-diene terpolymer, that contains about 56.7-59.7% by mass ethylene by ASTM D3900, Dow Chemical Company); Nordel™ IP 5565 (an amorphous EPDM that contains about 50% by mass ethylene by ASTM D3900, Dow Chemical Company); Nordel™ IP 4520 (an amorphous, high diene, EPDM that contains about 50% by mass ethylene by ASTM D3900, Dow Chemical Company); BUNA® EP G 3850 (an EPDM with ENB wt 7.8% and ethylene about 48 wt %); Buna® EP G 6850 (an ethylene-propylene-diene rubber (EPDM), amorphous; with ethylidene norbornene as termonomer and about 51% by mass ethylene according to ASTM D 3900, Lanxess Corporation); or Royalene® 563 (an ethylene-propylene ethylidene norbornene rubber that contains about 57.3% ethylene, Lion Copolymer Geismar, LLC).

The inner rubber barrier tube 102 and/or the rubber backing layer 106 may be prepared from a elastomeric composition comprising one or more EPDMs in a range from about 20 wt % to about 60 wt %; about 30 wt % to about 50 wt %; about 35% to about 45 wt %; or about 37 wt % to about 40 wt %, compared to the total weight of the elastomeric composition.

A blend of EPDM and chloroprene rubber (CR) may be employed in the elastomeric composition. A blend of EPDM/CR of from 90:10 to 70:30 parts by weight; 85:15 to 75:25 parts by weight, or about 80:20 parts by weight may be employed.

The inner rubber barrier tube 102 and/or the rubber backing layer 106 may be prepared from a elastomeric composition comprising one or more chloroprene rubbers in from 2 to 20 wt %, 5 to 15 wt %, 7 to 12 wt %, or about 10 wt % compared to total weight of the rubber tube or backing composition. The chloroprene rubber may be any suitable chloroprene rubber. The CR may help impart oil resistance to the tube or backing layer. The CR may be a M-modified BAYPREN® rubber (Lanxess AG). The chloroprene rubber may be a 2-chloro-1,3-butadiene polymer, such as BAPREN® 110, or BAYPREN® 112. The CR may be talc coated.

The rubber barrier tube 102 and/or the rubber backing layer 106 may be prepared from an elastomeric composition comprising from about 0.01 wt % to about 10 wt % of a phenylenedimaleimide; from about 0.1 wt % to about 5 wt %; from about 6 wt % to about 9 wt %; or from about 0.5 wt % to about 3 wt % of a phenylenedimaleimide. In some embodiments, the phenylenedimaleimide is N,N'-m-phenylenedimaleimide (e.g., T(MPBM)D-70, CAS RN: 3006-93-7; N,N'-1,3-phenylene bismaleimide; HVA-2 curative, DuPont Chemical Co.). The HVA-2 may be present in the composition used to prepare the rubber backing layer at from about 0.1 wt % to 3 wt %; from 1% to about 2% by weight; from about 1.00 wt % to about 1.5 wt % compared to the total weight of the filled elastomeric composition, or from 1 to 10 pph, 2 to 5 pph, or about 3 pph compared to 100 pph of the EPDM/CR blend.

The term "maleated compound" as used herein refers to a compound having one or more, or two or more, maleic anhydride substituents. The maleated compound may be a maleated polybutadiene. The maleated compound may be a polybutadiene adducted with maleic anhydride. The maleated compound may be a maleic anhydride adduct of a low molecular weight 1,4-cis polybutadiene which has succinic anhydride groups randomly distributed along the polymer chains. The maleated polybutadiene may be a maleated polybutadiene on a silica carrier. For example, the maleated polybutadiene may be a commercially available product, such as Ricobond™, for example, Ricobond® 1756 HS (Polybutadiene adducted with maleic anhydride, Cray Valley USA), or POLYVEST® MA 75 (a maleic anhydride adduct of a low molecular weight 1,4-cis polybutadiene which has succinic anhydride groups randomly distributed along the polymer chains, Evonik Corporation). The maleated compound may be present in the composition used to prepare the rubber barrier tube 102 and/or the rubber backing layer 106 at from about 0.1 wt % to about 10 wt %; from about 0.5 wt % to about 5 wt %; or from about 2 wt % to about 3 wt % compared to the total weight of the rubber composition, or from 5 to 15 pph, 7 to 12 pph, or about 10 pph compared to the EPDM/CR blend. The maleated compound is present in the composition in order to achieve maximum level of bonding.

The rubber barrier tube 102 and/or the rubber backing layer 106 may be prepared from an elastomeric composition that further comprises fillers. The filler may be selected from one or more of carbon black, silica, silicates, talc, aluminum silicate, calcium carbonate, zinc oxide, titanium dioxide, and stearic acid. For example, one or more fillers may be selected from a silica, for example HiSil 532EP™, or HiSil 243LD™ (precipitated amorphous silica from PPG Industries; Monroeville, Pa.); PV-Sil X513312 (silane treated precipitated silica; Polymer Valley,); zinc oxide, for example, AZO66 zinc oxide (U.S.Zinc), or Kadox 930™ (zinc oxide, Zinc Corporation of America; Monaca, Pa.), Zano 20 (zinc oxide, Umicore Zinc Chemicals; Angleur, Belgium); calcium carbonate, for example Hubercarb Q325™ (ground calcium carbonate, Akrochem Corp.; Akron, Ohio); talc, for example Mistron® vapor R (hydrous magnesium silicate, Imerys Talc), Nytal Talc (hydrous magnesium silicate, RT. Vanderbilt); carbon black, for example Continex™ N650 Carbon Black (carbon black, Continental Carbon; Houston, Texas), Vulcan® XC72R (powdered carbon black, Cabot Corp.; Billerica, Mass.), silicates, aluminum silicate, titanium dioxide, and stearic acid. In some embodiments, the filler may include a silane treated precipitated silica. The silane treated silica may be a mercaptosilane treated silica. Silane treated precipitated silica may be used, for example, to improve adhesion between the mineral and the polymer and other fillers, improve dispersion of mineral in polymer, reduce viscosity of filler/polymer mix, and/or increase mechanical properties.

The rubber barrier and/or backing composition has the advantage of allowing for high filler load, providing a more economical composition. The combined fillers may be present in the elastomeric composition at from 40 to 120 pph, 50 to 110 pph, 60 to 100 pph, 70 to 90 pph or about 80 pph compared to 100 pph of the EPDM/CR blend. The combined fillers may be present at from about 20 to 60 wt %, 30 to 50 wt %, or 35 to 45 wt % by weight of the composition used to prepare the elastomeric composition of the rubber barrier tube 102 and/or backing layer 106.

The rubber barrier tube 102 and/or backing layer 106 may be prepared from an elastomeric composition further comprising plasticizers. The plasticizer may include paraffinic oils such as a petroleum extract, heavy paraffinic distillate solvent; a paraffinic process oil; a paraffinic process oil silicon dioxide blend plasticizer, and/or a mineral oil. For example, the plasticizer may be SUNDEX 790TN (petroleum extracts, heavy paraffinic distillate solvent, Holly Frontier Lubricants), Sunpar 2280 DLC-ATM (paraffinic process oil silicon dioxide blend plasticizer, Natrochem Inc.), Drakeol® mineral oil (white mineral oil, Calumet Penreco; Dallas, Tex.), PD-23 White Oil (white mineral oil, Sonneborn, Inc.; Tarrytown, N.Y.). In some embodiments, the plasticizer is not a polybutene. The plasticizer may be present at from about 0.1 wt % to about 10 wt %; about 1 wt % to about 5 wt %; about 2 wt % to about 4 wt %, or about 2 wt % to about 3 wt % compared to weight of the composition used to prepare the rubber backing layer. The plasticizer may be present in an amount between from about 2 to about 8 pph, about 3 to about 7 pph, about 3.5 to about 5.5 pph, or about 5 pph compared to EPDM/CR rubber blend.

The rubber barrier tube 102 and/or backing layer 106 may be prepared from an elastomeric composition further comprising a peroxidic vulcanizing agent. Examples of peroxides used in some embodiments include, for instance: dicumyl peroxide, di-t-butyl peroxide, and t-butyl cumyl peroxide, and commercial products, such as LUPEROX® DCP40P-SP2 (scorch protected dicumyl peroxide), Luperox™ DC40P-SP2 (dicumyl peroxide extended on calcium carbonate and silica, Arkema) or Varox® DCP-99 (bis(1-methyl-1-phenylethyl) peroxide, RT. Vanderbilt). In some embodiments, an efficient peroxide, such as a dicumyl peroxide, is preferable. The peroxide may be present at about 0.1 wt % to about 5 wt %; at about 1 wt % to about 4 wt %; at about 2 wt % to about 4 wt %; at about 3 wt % to about 3.5 wt % by weight of the composition used to prepare the rubber backing layer, or about 3 to 10 pph, 4 to 8 pph, or 6 to 7 pph compared to 100 pph EPDM/CR rubber blend. In some embodiments, because HVA-2 is a reactive Type I co-agent that increases reaction rate and state of cure, any efficient peroxide, such as a dicumyl peroxide, is employed in the elastomeric composition to ensure consistent free radical formation occurs.

The rubber barrier tube 102 and/or backing layer 106 may be prepared from an elastomeric composition further comprising an antioxidant. Examples of antioxidants used in some embodiments include, for instance, Antioxidant DQ® (2,2,4-trimethyl-1,2-dihydroquinoline; Akrochem Corp.), Agerite MATM (2,2,4-trimethyl-1,2-dihydroquinolone polymer) or Irgafos® 168 (tris (2,4-di-tert-butylphenyl) phosphite, Ciba). In some embodiments, the antioxidant is present at about 0.01 wt % to about 5 wt % by weight of the rubber backing layer composition. In other aspects of an embodiment, the antioxidant is present at about 0.05 wt % to about 3 wt %; 0.1 wt % to about 1.5 wt %; or from about 0.1 wt % to about 1.0 wt % by weight of the composition used to prepare the rubber barrier or backing layer, or 0.1 to 3 pph, 0.5 to 2 pph, or about 1 pph antioxidant compared to 100 pph EPDM/CR rubber blend.

Figure 3:
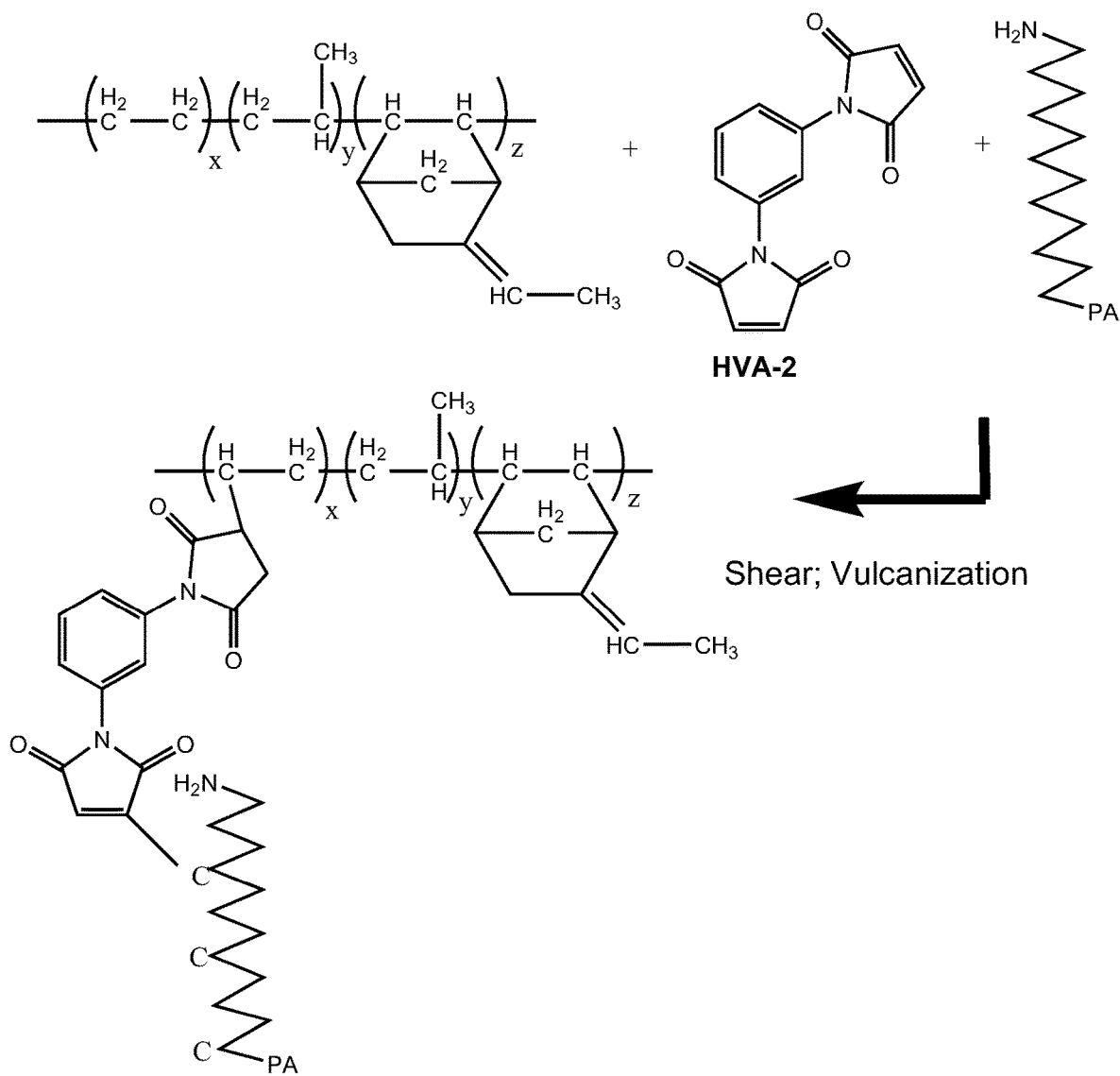
FIG. 3 shows chemistry of the HVA-2 bonding mechanism used to develop to the novel elastomeric tube layer capable of direct bonding of EPDM to polyamide (PA). The HVA-2 coagent is capable of forming very reactive radicals. Bonding may occur through an "Alder-ene" reaction using a free radical mechanism. Bond dissociation energy may be 350 KJ/mol. EPDM "x"=ethylene content, "y"=propylene content, "z"=ethylidene norbornene (ENB) content.

The rubber barrier and/or backing compositions provided herein are capable of a dual bonding mechanism for direct bonding to the polyamide layer without an intervening adhesive layer. The maleimide groups are capable of forming covalent C—C interactions with the carbon backbones of both the EPDM polymer and also the polyamide, as shown in FIG. 3. Similarly, a possible bonding mechanism between the EPDM and the MA is through a C—C bond. In some embodiments, the green elastomeric composition exhibits tensile strength>200 psi, % elongation>200%, and >100 lbf/in (>11.3 Newton meters) in Die C test.

The hose of FIG. 1 comprises a polyamide layer 104 in order to impart permeation resistance to the hose. The polyamide layer 104 is directly bonded, via the dual bonding mechanism, to the rubber barrier tube 102 and the rubber backing layer 106 upon cure. In some embodiments, the polyamide layer 104 is prepared from a composition comprising PA6,6 and/or PA6. In some embodiments, the polyamide layer is prepared from a composition comprising PA 6,6. The polyamide layer 104 is a distinct layer from the rubber backing layer 106. That is, the components of the polyamide layer 104 are not present in the rubber backing layer 106. The polyamide layer 104 is a continuous layer.

In some embodiments, the polyamide layer 104 comprises a polyamide molding component that contains amide —CO—NH— bonds in its main chain and additives. The polyamide layer 104 may be a single polyamide layer. The polyamides are prepared in a known manner by polycondensation. In some embodiments, the polyamide is selected from a polyamide wherein the ratio between the COOR and NH2 groups in the polyamide is preferably 1:x where 1<x<100. In some embodiments, heat stabilized polyamide resins are suitable. Examples of suitable nylon polyamides include PA 46 (polyamide 46; nylon 46), PA 6 (polyamide 6; nylon 6), PA 6,6 (polyamide 6,6; nylon 6,6), PA 11 (polyamide 11, nylon 11), PA 12 (polyamide 12; nylon 12), PA 612 (polyamide 612; nylon 6,12), and PA 610 (polyamide 610; nylon 6,10). In some embodiments, suitable nylon polyamides include PA 6, PA 6,6, PA 12 and PA 11. In still other embodiments, suitable nylon polyamides include PA 6 and PA 6,6. In yet other embodiments, suitable nylon polyamides include PA 6,6. In some embodiments, the polyamide layer 104 is prepared from a commercially available product, such as DuPont Zytel® 45HSB PA 6,6.

In some embodiments, the polyamide layer 104 is prepared from a polyamide composition further comprising additives such as reinforcing agents, flameproofing agents, stabilizers, processing auxiliaries, blowing agents, metal fibers, carbon black, graphite and metal leaf, titanium dioxide, colored pigments and zinc sulfide.

In the hose of FIG. 1, the inner rubber barrier tube 102 and rubber backing layer 106 are chemically covalently bonded to the intervening polyamide layer 104 without the use of adhesive. In one embodiment, the inner rubber barrier tube 102 and the rubber backing layer 106, prepared from a composition comprising EPDM, CR, MAH, and HVA-2, bonds directly to the polyamide layer 104 comprising nylon 6,6 upon cure.

Figure 4:
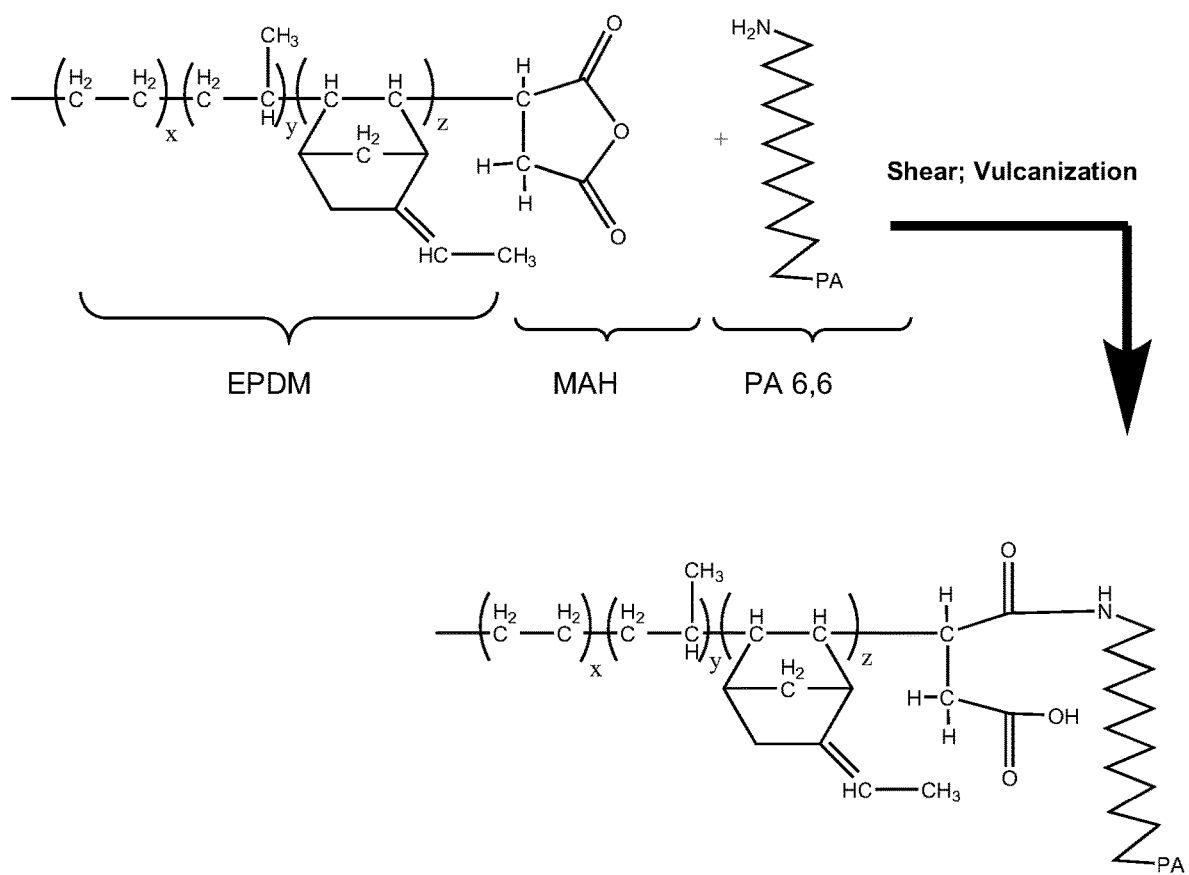
FIG. 4 shows the chemistry of the maleic anhydride bonding mechanism used to develop to the novel elastomeric tube layer capable of direct bonding of EPDM to polyamide (PA). The maleic anhydride may undergo a Diels Alder reaction. The anhydride groups may react with the amine end of the PA 6,6 forming a C—N bond (310 KJ/mol dissociation energy). EPDM structure "x"=ethylene content, "y"=propylene content, "z"=ethylidene norbornene (ENB) content.

Although the exact bonding mechanism between the layers is unclear, without being bound by theory possible bonding mechanisms are shown in FIGS. 3 and 4. The EPDM structure in FIG. 3 shows "x"=ethylene content, "y"=propylene content, "z"=ethylidene norbornene (ENB) content in wt % ranges. The EPDM may have combined average ethylene content "x" within the range of x::S 65 wt %; 45-65 wt %; 50-65 wt %; or 50-60 wt % ethylene. The EPDM may have propylene content "y" within the range of 30-50 wt %, or 35-45 wt %. The EPDM may have an ethylidene norbornene (ENB) content "z" within the range of 1-10 wt %, 2-8 wt %, or 4-6 wt % ENB. The EPDM may have a Mooney Viscosity (ML 1+4 at 125° C.) within the range from about 20 MU to about 80 MU; or within the range from about 20 MU to about 30 MU.

Traditional press cure or extrusion processing methods exploits two different proposed mechanisms. First, the MA might bond to the amine end of nylon 6,6 forming a C—N bond by Diels-Alder chemistry. Second, the cyclic carbon on the maleimide groups might form covalent C—C interactions to the nylon 6,6 backbone through an "Alder-ene" reaction using a free radical mechanism. In one embodiment, the rubber barrier layer 102, polyamide layer 104 and the rubber backing layer 106 undergo shearing and vulcanization at a temperature of about 300-3500F.

The reinforcement layer 108 comprises a textile. Examples of suitable textiles for the reinforcement layer 108 include aramid, polyester braid, nylon, polyvinyl alcohol (PVA), cotton, and rayon. In some embodiments, the reinforcement layer 108 is a discontinuous layer. In some embodiments, the reinforcement layer 108 is a discontinuous layer comprising a polyester braid, aramid, nylon, cotton, or rayon. For example, the textile may be in the form of a yarn, braid, cord, or fabric adhered to the tube and cover layers. In some embodiments, the cover layer 110 and the rubber backing layer 106, migrate through the interstices of the textile in the reinforcement layer 108 and vulcanize together.

The outer cover layer 110 has the largest outer diameter of the layers. The outer cover may be heat- and ozone-resistant synthetic elastomer. In some embodiments, the cover layer 110 comprises a chlorobutyl rubber. In some embodiments, there is no adhesive between the cover layer 110 and the reinforcement layer 108.

A type Chose according to the disclosure comprising a rubber barrier layer and a rubber backing layer that directly bond to a polyamide barrier layer, was developed for automotive use. EPDM was selected for use as the base thermoplastic elastomer polymer for use in preparation of the rubber barrier layer 102 and rubber backing layer 106 of the hose in order to maintain heat resistance upwards of 135° C. while simultaneously maintaining the low temperature sealing capability (−40° C.) desirable for a refrigerant hose. Chloroprene rubber was blended with the EPDM to improve oil resistance.

Compression set (C Set) is one of the primary characteristics of a rubber compound directing low temperature sealing capability. EPDM ethylene content is the primary factor influencing this compression effect. As the ethylene content increases, a low-level of crystallinity develops above 55%-65%. If the ethylene/propylene ratio is about equal and the distribution of both monomers in the polymer chain is random then the EPDM is amorphous. Polymers with ethylene content above 60% tend to show high compression set, while the amorphous (less than 60% ethylene) materials provide decreased set values at low temperatures.

A Banbury™ mixer (Farrel Corporation) was used to mix the different rubber formulations according to ASTM D 3182-07. First, fillers, oils and antioxidant were added in a 60 second mix cycle at 165° C. Second, the rubber polymers were added into the mixer in a 120 second mastication cycle at 165° C. Then, process aids, such as maleimide curative and vulcanizing agents, were added in a 120 second mix cycle at 220° C. Fourth, the composition undergoes a fourth mix cycle for 20 seconds at 235° C.

After the rubber drops from the mixer, the rubber was manually applied to a dual-roll mill and sheeted until the thickness is 0.75"-1.25", according to ASTM B 947-06. The dual roller mill stage sheets and cools the mixed formulation.

The cure kinetics of the rubber formulations were assessed according to ASTM D 2084-95 (cure study). Rheometry was measured using a Monsanto RPA2000 for 45 minutes at 160° C.

The sheeted material then was subjected to the cure press for vulcanization. Based on T90 values from the cure study, the sheeted material from the dual roller mill was inserted into the cure press and vulcanized at 320° F. for 45 minutes.

Next, the rubber underwent a Shore A hardness test. In accordance with ASTM D 2240-95, the hardness was tested using a calibrated Instron automatic Durometer tester. The compression set was tested in accordance with ASTM D 395-89. The sample was prepared as follows. First, the EPDM rubber composition was vulcanized for 60 minutes at 320° F. into 0.49" thick by 1.14" diameter buttons. Then the buttons were compressed by 25% into a C Set fixture. After curing, the samples were exposed at −40° C. for 24 hours and samples were removed and measured at specified time increments. Last, the overall compression set was assessed on a sample that was allowed to run the full 24 hours and then rebound at room temperature outside of the C Set fixture prior to the final measurement.

The strip adhesion test was conducted in accordance with ASTM D 413-81. This test measured the adhesion strength between various embodiments of the rubber backing layer with an embodiment of the polyamide layer. Specimen Type B-90° peel was used. The sample was prepared using polyamide 6,6 injection molded samples that were 4" long, 1" wide, and 0.075" thick. The PA 6,6 samples were laid on top of rubber samples that were 4" long, 1" wide and 0.09" thick, on a standard press cure. The samples were vulcanized for 45 minutes at 320° F. Twenty-four hours after vulcanization, the samples were tested on a calibrated Instron 5965 (according to ASTM D413 Type B (90° C. peel)) using a 5 KN load cell at a rate of 2"/min. Tensile strength and percent elongation were tested in accordance with ASTM D 412. Standard ASTM samples were tested on a calibrated Instron 5965 using a 5 KN load cell at a rate of 20"/min.

The Green Rubber Shelf Life test evaluated how the measurements changed over time. Samples were cured at time intervals over 3 months (45" at 320° F.) from a standard uncured stock Those samples underwent tests according to ASTM D 412, ASTM D 2084-95, and ASTM D 413-81.

In some embodiments, the cured elastomeric composition exhibits minimum tensile strength of 1425 psi, minimum elongation of 120%, minimum modulus of 1125 psi, Shore A hardness of 84 (±5), and specific gravity of 1.25 (±0.3).

Permeation of test hose and comparative product hose was tested in accordance with SAE J2064. Samples were stabilized for 24 hours at 23° C.±2° C. before testing and checked to ensure specified charge and identify charge loss.

EXAMPLES

Example 1

Adhesion Between Rubber Backing and Polyamide Layers

Figure 2A:
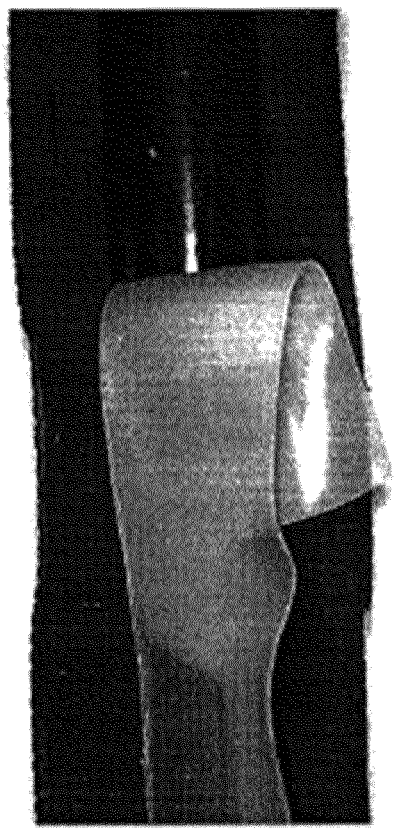
FIG. 2A shows a prior art hose exhibiting low adhesion of the tube/cover to the polyamide 66 barrier layer.
Figure 2B:
FIG. 2B shows a hose according to the disclosure wherein the novel elastomeric tube/cover exhibits strong direct bonding to a polyamide 6,6 barrier layer such that the layers cannot be separated without destroying the tube.

A comparative hose comprising a polyamide layer and a rubber backing layer without direct bonding utilizing an adhesive is shown in FIG. 2A. The comparative hose polyamide layer is easily separated from the rubber layer. In contrast, a hose according to the invention is shown in FIG. 2B. The elastomeric layer could not be separated from the polyamide layer without destroying the layers.

Example 2

Type C Barrier Direct Bonding Composition

An inventive elastomeric composition was prepared according to the protocols above according to Table 1.

TABLE 1

| Elastomeric composition A | | | |
|---|---|---|---|
| Ingredients | Component | PPH | % Content |
| Vistalon 2504 | EPDM, low Mooney, low ethylene | 80.00 | 38.93 |
| BAPREN 110 | Chloroprene rubber helps oil resistance | 20.00 | 9.73 |
| MISTRON VAPOR R | Talc filler helps with polymer wetting | 10.00 | 4.87 |
| N650 Black Pelletized | Carbon black reinforcement | 30.00 | 14.60 |

TABLE 1-continued

Elastomeric composition A

| Ingredients | Component | PPH | % Content |
|---|---|---|---|
| HI-SIL 532EP | Precipitated silica reinforcement | 20.00 | 9.73 |
| Hubercarb Q 325 | calcium carbonate filler | 15.00 | 7.30 |
| SUNDEX 790TN | paraffinic plasticizer | 5.00 | 2.43 |
| RICOBOND 1756 HS | maleated polybutadiene, on silica carrier | 10.00 | 4.87 |
| ANTIOXIDANT DQ | 2,2,4-trimethyl-1,2-dihydroquinoline | 1.00 | 0.49 |
| AZO66 zinc oxide | zinc oxide | 5.00 | 2.43 |
| T(MPBM)D- 70 | HVA-2 maleimide curative | 3.00 | 1.46 |
| LUPEROX DCP-40P-SP2 | dicumyl peroxide, scorch protected curative | 6.50 | 3.16 |
| | Totals: | 205.5 | 100 |

After cure (slab) for 30 min at 320° F., the cured elastomeric composition exhibited minimum tensile strength of 1425 psi, minimum elongation of 120%, minimum modulus of 1125 psi, Shore A hardness of 84 (±5), and specific gravity of 1.25 (±0.3).

Example 3

Exemplary Type C Hose

A type C Class 1 hose was prepared according to FIG. 1 having an inner elastomeric barrier tube 102 prepared of composition of example 2, a thermoplastic barrier layer 104 comprising polyamide 6,6, an elastomeric backing layer 106 prepared from composition of example 2, a single poly braid layer 108, and an elastomeric cover prepared from the chlorobutyl composition of example 4. The hose was prepared in various sizes −06, −08, −10, −12 and −14 and operating pressures, minimum burst pressure, minimum bend radius, and weight were determined as shown in Table 2.

TABLE 2

Inventive Hose Sizes and Characteristics

| Size | I.D. (REF) mm [in] | O.D. (MAX) mm [in] | Operating Pressure bar [psi] | Min. Burst Pressure bar [psi] | Min. Bend Radius mm [in] | Weight kg/m [lbs/ft] |
|---|---|---|---|---|---|---|
| −06 | 8.1 [.32] | 15.2 [.60] | 35 [500] | 140 [2000] | 50.8 [2.00] | 0.13 [.09] |
| −08 | 10.7 [.42] | 17.8 [.70] | 35 [500] | 140 [2000] | 63.5 [2.50] | 0.18 [.12] |
| −10 | 12.9 [.51] | 19.9 [.79] | 35 [500] | 140 [2000] | 76.2 [3.00] | 0.19 [.13] |
| −12 | 16.1 [.63] | 24.1 [.95] | 24 [350] | 120 [1750] | 101.6 [4.00] | 0.34 [.23] |
| −14 | 18.8 [.74] | 27.6 [1.08] | 24 [350] | 120 [1750] | 127 [5.00] | 0.43 [.29] |

The operating pressure was 500 psi for −06, −08, −10 inventive hoses, and 350 psi for −12 and −14 hoses. The minimum burst pressure was 2000 psi for −06, −08, −10 inventive hoses, and 1750 psi for −12 and −14 hoses. The minimum bend radius was 50.8 mm, 63.5 mm, 76.2 mm, 101.6 mm and 127 mm for −06, −08, −10, −12 and −14 size inventive hoses respectively.

Example 4

Chlorobutyl Cover Composition

A chlorobutyl cover composition was prepared according to the protocols above according to Table 3.

TABLE 3

Chlorobutyl Cover Composition

| Ingredients | Component | PPH | Wt % Content |
|---|---|---|---|
| Chlorobutyl 1066 | Chlorobutyl polymer | 100 | 46.84 |
| N660BLACK PELETIZED | Carbon black | 95 | 44.5 |
| AZO66 zinc oxide | Zinc oxide | 5.00 | 2.34 |
| ARROWAX 145 beads | Paraffin wax for ozone resistance | 3.00 | 1.41 |
| AKRO-MAG BARS GREEN LABEL | Magnesium oxide | 0.50 | 0.23 |
| TMTD pellets | Tetramethylthiuram disulfide cure accelerator | 1.00 | 0.47 |
| 40 MS Flakes | Aromatic hydrocarbon homogenizing agent | 2.00 | 0.94 |
| P-90 RESIN | Octylphenol and formaldehyde resins used as tackifying agent | 2.00 | 0.94 |
| PRO LUBE | Process aid | 5.00 | 2.34 |
| | Totals: | 213.5 | 100 |

Example 5

Development of Rubber Backing Layer to Minimize Extractible Content and Maximize Direct Bonding to Polyamide Previously a Type E refrigerant hose was developed comprising an EPDM backing layer capable of direct bonding to an inner polyamide veneer layer without adhesive, as disclosed in U.S. Pat. No. 9,841,125 B2, Clark et al., which is incorporated herein by reference. The Type E veneer refrigerant hose of Clark et al. exhibits very low permeation. The backing layer of Clark et al. includes 30 pph of a paraffinic plasticizer relative to the EPDM content. The backing layer composition of Clark et al. when employed in a different configuration as a barrier layer in a Type C hose design was found to exhibit an extractible content higher than internal standards of no more than 5 g/m2 in an extraction test per SAEJ3062. An alternative novel direct bonding elastomeric composition for use in inner tube layer and/or backing layer of a type C refrigerant hose was developed. A new rubber backing formulation was designed to maintain good direct bonding characteristics to a thermoplastic such as a polyamide or polyvinylidene fluoride (pvdf), while minimizing permeation and extractible content. In addition, a chloroprene rubber was added to the EPDM rubber to improve oil resistance.

An attempt to replace the paraffinic plasticizer to minimize extractible content with a low extractible polybutene caused the composition to lose its direct bonding capabilities.

To determine the minimum amount of plasticizer to obtain good adhesion to PA 6,6, plasticizer SUNDEX 790TN was added to the composition at 0%, 0.50%, 1.00%, 1.50%, 2.50%, 5.00%, 7.00%, and 14.00% (0, 1, 2, 3, 5, 10, 15 and 30 parts per hundred (pph) relative to 100 pph of the EPDM/CR rubber blend). After cure, adhesion (lbf) to polyamide 6,6 was determined and extractible content was determined by extraction test performed per SAEJ3062. Adhesion results are shown in Table 4 and FIG. 7.

TABLE 4

Plasticizer vs. Adhesion to Polyamide 6,6

| Plasticizer (%) | Plasticizer (pph) | Adhesion to PA 6,6 (lbf) | Adhesion Coverage |
|---|---|---|---|
| 0.00% | 0 | 3.18 | 0% |
| 0.50% | 1 | 9.71 | 0%-25% |
| 1.00% | 2 | 22.65 | 25%-50% |
| 1.50% | 3 | 54.89 | 75%-100% |
| 2.50% | 5 | 49.23 | 75%-100% |
| 5.00% | 10 | 46.47 | 75%-100% |
| 7.00% | 15 | 50.18 | 75%-100% |
| 14.00% | 30 | 52.47 | 75%-100% |

Figure 7:
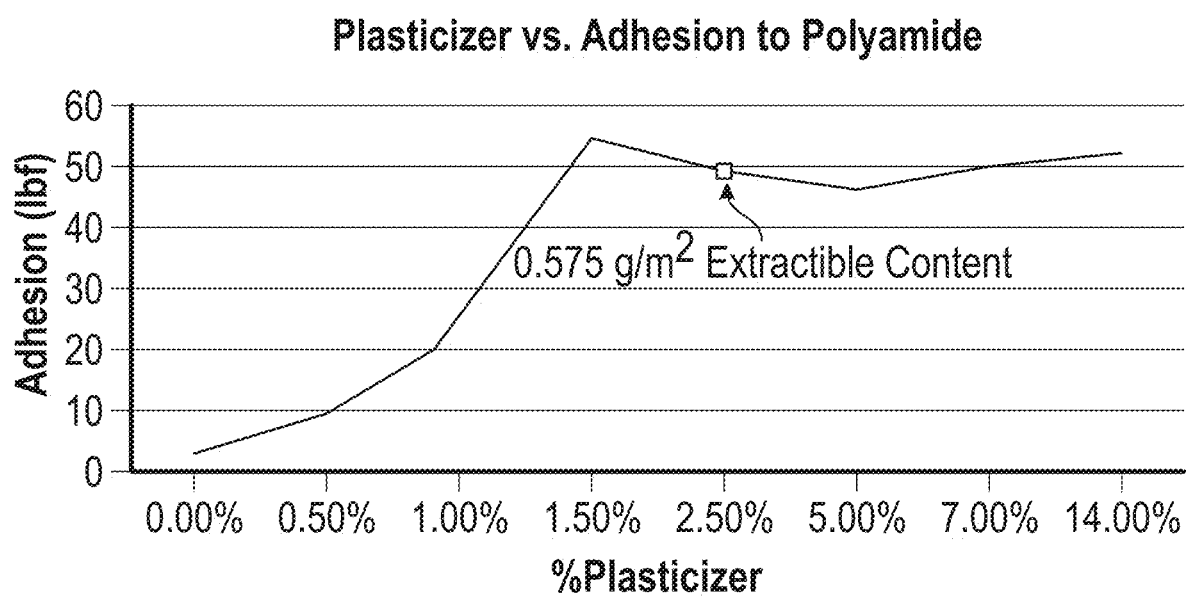
FIG. 7 shows a graph of the effect of increasing the amount of plasticizer in the novel elastomeric tube formulation on the adhesion to a polyamide thermoplastic layer, and optimization to minimize extractible content.

As shown in Table 4 and FIG. 7, at least about 1.5% (3 pph) plasticizer is required to obtain at least about 40 lbf adhesion to polyamide 6,6. At about 2.5% (5 pph) plasticizer, good adhesion of >40 lbf, or >45 lbf was obtained. At the same time, extractible content was minimized to an average of 0.575 g/m2, exceeding SAE requirements (limit 118 g/m2) and Internal Requirements (limit 5 g/m2). In the elastomeric composition, the plasticizer may be present from about 3.5 to 5.5 pph, 4.5 to 5.5 pph, or about 5 parts per hundred to achieve good direct bonding of >40 lbf, or >45 lbf to polyamide while exhibiting <5 g/m2, <3 g/m2, or <1 g/m3 extractible content.

Example 6

Extraction Test

The inventive hose according to example 2 was subjected to an extraction test performed per SAEJ3062 Sec 5.10. The scope of SAE J3062 covers hose intended for containing and circulating lubricant, liquid and gaseous R134a and/or R1234yf refrigerant, for example, in automotive air conditioner systems. The SAE requirement is <118 g/m2 extractible content from the tube. An internal requirement was set at <5 g/m2 extractible content from the tube. Actual EC0007 inventive hose results were Avg=0.575 g/m2, Min=0.0 g/m2, and Max=0.954 g/m2 extractible content. The inventive hose EC0007 outperformed both SAEJ3062 and internal requirements for extractible content. The inventive hose may exhibit <5 g/m2, <3 g/m2, <1 g/m2, or <0.75 g/m2 extractible content under SAE J3062 Sec 5.10.

Example 7

Force to Bend Test

A three-point bend test was performed comparing various sizes of the type C inventive hose of Example 3 (EC007), a comparative type E hose GH001 according to U.S. Pat. No. 9,841,125, and a comparative type Chose 4890/4880 having a bromobutyl tube, polyamide barrier, a single braid polyester reinforcement layer, and chlorobutyl blend cover. Results are shown in Table 5.

TABLE 5

Three Point Force to Bend test

| hose | −6 | −8 | −10 | −12 | −14 |
|---|---|---|---|---|---|
| Comparative GH00I (Type E) | 2.06 lbf | 2.69 lbf | 3.10 lbf | 3.83 lbf | N1A |
| Inventive EC007 (Type C) | 1.86 lbf | 2.12 lbf | 2.02 lbf | 3.06 lbf | 5.89 lbf |
| Comparative 4890/4880 (Type C) | 1.69 lbf | 1.33 lbf | 1.74 lbf | 2.63 lbf | 6.06 lbf |

Each size of the inventive type Chose was more flexible than the comparative type E hose. The size −14 inventive hose exhibited greater flexibility than the comparative type Chose.

Example 8

Working Temperature Range

The scope of SAE J3062 covers hose intended for containing and circulating lubricant, liquid and gaseous R134a and/or R1234yf refrigerant, for example, in automotive air conditioner systems. Under SAE J3062, the hose shall be designed to be functional over a temperature range of −30° C. to 125° C. The inventive hose exhibits a working temperature range of −40° C. to 135° C., exceeding the requirements of SAE J3062.

Example 9

Permeation Testing

Permeation testing was performed in accordance with SAE J2064. Specifically, the charged samples were stabilized for 24 hours at 23° C.±2° C. prior to testing. The test specimens consisted of four coupled hose assemblies that have I 07 cm±1.2 cm of exposed hose between couplings. Three of the coupled hose assemblies were used for determining the permeation rate through the test and control hoses of refrigerants RI 34a and R1234yf at specific temperatures. The fourth coupled and plugged hose assembly was used for a control hose. One end of each hose assembly was attached to a canister. The other end was capped with a plug. The coupled hose assemblies were weighed and recorded to 0.01 g to establish an initial weight prior to charging.

Figure 5:
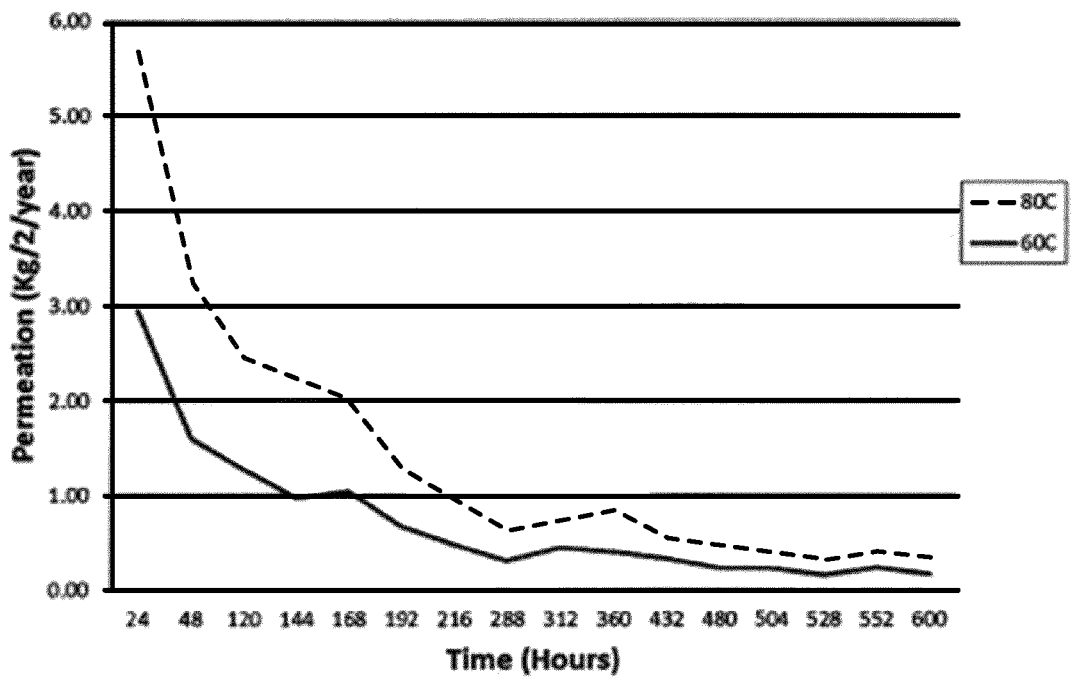
FIG. 5 shows a graph over 600 hours (25 days) of the permeation of the inventive hose using RI 234yf refrigerant at 60° C. and 80° C. Permeation units are shown as kg/m2/year. The permeation test is run to steady state, wherein 3 consecutive readings within about 5-10% of each other, or to 600 hours (25 days). The inventive hose exhibits less than 0.5 kg/m2/year permeation of R1234yf at either 60° C. or 80° C. after 25 days.
Figure 6:
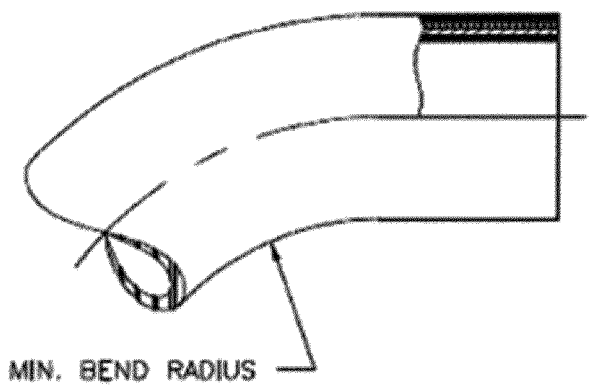
FIG. 6 shows an illustration of the minimum bend radius test.

The test samples were evacuated and then charged with refrigerant to 70%±3% of the internal volume of the assembly and then reweighed. The weights were taken at room temperature. The test temperature was 80° C.±2° C. or 60° C.±2° C. The samples were weighed at the end of the first 24-hour temperature exposure and at period intervals. The weighings were reported in net loss of grams, calculated by charged sample weight loss minus control sample weight loss. The net weight loss versus time was recorded for 25 days. Conversion factors were then used to calculate the kg/m2/year rate of permeability. Results are shown in FIG. 5 and in Tables 6 and 7.

Both Inventive hose and comparative hose had ¾ inch I.D. The inventive hose EC007-14 hose had a reduced bore having ¾ in I.D. The comparative hose 4880-12 had a full bore of ¾ inch. Thus both hoses had same inner diameter.

TABLE 6

Permeation of hoses at 60° C. (Kg/M2/year)

| | Refrigerant/Exposure Temperature | | | |
|---|---|---|---|---|
| | R134a@60° C. | | R1234yf@ 60° C. | |
| Hours Exposed | Inventive EC007-14 | Comparative 4880-12 | Inventive EC007-14 | Comparative 4880-12 |
| 456 | 0.64 | 0.87 | 0.38 | 0.61 |
| 480 | 0.27 | 0.32 | 0.14 | 0.20 |
| 504 | 0.34 | 0.55 | 0.17 | 0.32 |
| 528 | 0.39 | 0.34 | 0.21 | 0.21 |
| 552 | 0.40 | 0.43 | 0.22 | 0.28 |
| 600 | 0.28 | 0.53 | 0.21 | 0.34 |

TABLE 7

Permeation of hoses at 80° C. (Kg/M2/year)

| | Refrigerant/Exposure Temperature | | | |
|---|---|---|---|---|
| | R134a@80° C. | | R1234yf@ 80° C. | |
| Hours Exposed | Inventive EC007-14 | Comparative 4880-12 | Inventive EC007-14 | Comparative 4880-12 |
| 456 | 1.16 | 1.73 | 0.70 | 1.21 |
| 480 | 0.58 | 0.58 | 0.30 | 0.36 |
| 504 | 0.58 | 1.16 | 0.28 | 0.69 |
| 528 | 0.77 | 0.58 | 0.41 | 0.37 |
| 552 | 0.77 | 0.89 | 0.42 | 0.57 |
| 600 | 0.58 | 0.96 | 0.44 | 0.61 |

After 600 hours at 60° C., inventive hose of example 2 exhibited no more than 1 kg/m2/year, or no more than 0.30 kg/m2/year, permeation after 600 hours of both R134a and R1234yf.

After 600 hours at 80° C., inventive hose of example 2 exhibited less than 1 kg/m2/year, or less than 0.60 kg/m2/year, permeation after 600 hours of both R134a and R1234yf.

Example 10

Alternative Type C Barrier Direct Bonding Composition

In an attempt to improve green strength without sacrificing adhesion of the elastomeric composition to the polyamide, another inventive elastomeric composition was prepared according to Table 8. In this example, a combination of a low ethylene EPDM and a high ethylene EPDM was employed to arrive at an EPDM blend having a combined average of no more than about 65 wt % ethylene content. However, when an EPDM or an EPDM blend having a combined average ethylene content of >65 wt % was employed, undesirably lower levels of adhesion between rubber and nylon were observed.

TABLE 8

Elastomeric composition B

| Ingredients | Component | PPH | % Content |
|---|---|---|---|
| Vistalon 2504 | EPDM, low Mooney, low ethylene | 60.00 | 28.85 |
| Vistalon 5601 | EPDM, high Mooney, high ethylene | 20.00 | 9.62 |
| BAPRENE 110 | Chloroprene rubber helps oil resistance | 20.00 | 9.62 |
| MISTRON VAPOR R | Talc filler helps with polymer wetting | 10.00 | 4.81 |
| Hubercarb Q 325 | calcium carbonate filler | 15.00 | 7.21 |
| SUNDEX 790TN | paraffinic plasticizer | 7.50 | 3.61 |
| RICOBOND 1756 HS | maleated polybutadiene, on silica carrier | 10.00 | 4.81 |
| ANTIOXIDANT DQ | 2,2,4-trimethyl-1,2-dihydro-quinoline | 1.00 | 0.48 |
| KADOX 930 (ZNO) | Zinc oxide filler | 5.00 | 2.40 |
| T(MPBM)D- 70 | HVA-2 maleimide curative | 3.00 | 1.44 |
| LUPEROX DCP-40P-SP2 | dicumyl peroxide, scorch protected curative | 6.50 | 3.13 |
| PV-Sil ® X513312 | Precipitated silica filler | 20.00 | 9.62 |
| N550BLACK | Carbon black filler | 30.00 | 14.42 |
| | Totals: | 208.00 | 100 |

The green composition B was cured for 45 minutes at 157° C. Original properties of composition B compared to comparably cured composition A are shown in Table 9.

TABLE 9

Original properties elastomeric compositions, cured 45 minutes @ 157° C.

| Test | Units | Composition B | Composition A |
|---|---|---|---|
| TS Scorch | Min | 5.39 | 7.8 |
| MooneyVisc | MS(1 + 4) | 33.32 | 27 |
| Tensile | psi | 1849.72 | 1831.42 |
| Elongation | % | 166.38 | 164.65 |
| 10% Mod. | psi | 378.47 | 385.27 |
| 100% Mod. | psi | 1290.71 | 1276.53 |
| Hardness | pts A | 83 | 87.6 |
| Die C | lbf/in | 197.14 | 173.48 |
| Adhesion PA66 | Visual % | 100% | 100% |

As shown in Table 9, composition A and B exhibited similar cured composition properties including a minimum tensile strength of 1425 psi; a minimum % elongation of 120%; a minimum 100% modulus of 1125 psi; and a Shore A hardness of 84 (±5).

Green strength studies of composition B and composition A were performed and results are shown in Table 10.

TABLE 10

Green Strength Studies

| Test | Units | Composition B | Composition A |
|---|---|---|---|
| Tensile | psi | 327.56 | 167.75 |
| Elongation | % | 238.84 | 156.63 |
| DieC | lbf/in | 110.389 | 55.43 |

As shown in Table 10, composition B exhibited improved green strength compared to composition A, including tensile strength>200 psi, % elongation>200%, and >100 lbf/in (>11.3 Newton meters) in Die C test.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hose, comprising a multiplicity of layers including:
an innermost elastomeric layer directly bonded to a polyamide (PA) layer without an intervening adhesive,
wherein the innermost elastomeric layer is prepared from a first elastomeric composition comprising a blend of an ethylene propylene diene terpolymer rubber (EPDM) and a chloroprene rubber (CR), a phenylenedimaleimide, and a maleated compound.

2. The hose of claim 1, wherein the blend of EPDM/CR is in a weight ratio of from 90:10 to 70:30.

3. The hose of claim 1, wherein the EPDM comprises one or more EPDMs comprising a combined average of no more than about 65 wt % ethylene content, optionally comprising a low ethylene EPDM having no more than about 60 wt % ethylene content.

4. The hose of claim 1, wherein the first elastomeric composition further comprises a plasticizer.

5. The hose of claim 4, wherein the plasticizer is present in the elastomeric composition at from about 2 to about 8 parts per hundred (pph) relative to 100 pph of the EPDM/CR rubber blend.

6. The hose of claim 4, wherein the plasticizer is one or more selected from the group consisting of petroleum extract, heavy paraffinic distillate solvent, a paraffinic process oil, a paraffinic process oil silicon dioxide blend and a white mineral oil.

7. The hose of claim 1, wherein the phenylenedimaleimide is present in the elastomeric composition at from 1 to 10 pph relative to 100 pph of the EPDM/CR blend.

8. The hose of claim 1, wherein the phenylenedimaleimide is N,N'-m-phenylenedimaleimide (HVA-2).

9. The hose of claim 1, wherein the maleated compound is present in the elastomeric composition at from 5 to 15 pph relative to 100 pph of the EPDM/CR blend.

10. The hose of claim 1, wherein the maleated compound is a maleated polybutadiene.

11. The hose of claim 1, wherein the first elastomeric composition further comprises one or more fillers.

12. The hose of claim 11, wherein the combined one or more fillers is present at from 40 to 120 pph relative to 100 pph of the EPDM/CR blend.

13. The hose of claim 11, wherein the one or more fillers is/are selected from the group consisting of carbon black, silica, silicates, talc, aluminum silicate, calcium carbonate, zinc oxide, titanium dioxide, and stearic acid.

14. The hose of claim 1, wherein the first elastomeric composition further comprises an antioxidant, and an organic peroxide.

15. The hose of claim 1, wherein the polyamide layer is prepared from a polyamide composition comprising one or more of polyamide 6,6; polyamide 6; or polyamide 6/12.

16. The hose of claim 1, wherein the hose comprises in an inner-most to outer-most direction the inner elastomeric layer, the polyamide layer, an elastomeric backing layer, a reinforcement layer, and an outer elastomeric cover layer.

17. The hose of claim 16, wherein the elastomeric backing layer is prepared from the first elastomeric composition.

18. The hose of claim 16, wherein the elastomeric backing layer is directly bonded to the polyamide layer without adhesive.

19. The hose of claim 16, wherein the reinforcement layer comprises a textile selected from the group consisting of aramid, polyester braid, nylon, polyvinyl alcohol (PVA), cotton, rayon and a copolyester braid.

20. The hose of claim 16, wherein the outer cover layer is prepared from a second elastomeric composition comprising a chlorobutyl rubber.

21. The hose of claim 1, wherein the hose exhibits no more than 1 kg/m$^2$/year permeation of a refrigerant after 600 hours at 60° C. when subjected to a permeation test in accordance with SAE J2064, wherein the refrigerant is selected from the group consisting of R134a and R1234yf.

22. The hose of claim 1, wherein the hose exhibits no more than 1 kg/m$^2$/year permeation of a refrigerant after 600 hours at 80° C. when subjected to a permeation test in accordance with SAE J2064, wherein the refrigerant is selected from the group consisting of R134a and R1234yf.

23. The hose of claim 1, wherein the hose exhibits no more than 5 g/m$^2$ extractible content when subjected to an extraction test performed according to SAE J3062.

24. The hose of claim 1, wherein the inner elastomeric layer exhibits adhesion to the polyamide layer of greater than 40 lbf, when subjected to an adhesion test performed according to SAE J3062.

25. The hose of claim 1, wherein the elastomeric composition, in cured form, exhibits
a minimum tensile strength of 1425 psi; a minimum elongation of 120%;
a minimum modulus of 1125 psi; and a Shore A hardness of 84 (±5); and
a specific gravity of 1.25 (±0.3).

26. A method of making a hose, comprising:
blending a first composition comprising a blend of an ethylene propylene diene terpolymer rubber (EPDM) and a chloroprene rubber (CR), a malcated compound, and phenylenedimalemide and extruding the first composition over a mandrel to form an inner elastomeric layer;
applying a thermoplastic barrier layer composition comprising a polyamide over the inner elastomeric layer without an intervening adhesive;
extruding an elastomeric backing layer over the polyamide layer;
applying a textile reinforcement layer over the rubber backing layer;
extruding an elastomeric cover layer over the reinforcement layer to form a green hose;
vulcanizing the green hose to form a cured hose; and
expelling the cured hose from the mandrel.

27. The method of claim 26, wherein said extrusion comprises shearing and heating.

28. The method of claim 26, wherein said vulcanizing occurs at 280-330° F.

* * * * *